United States Patent
Ito et al.

(10) Patent No.: US 7,923,858 B2
(45) Date of Patent: Apr. 12, 2011

(54) ELECTRIC POWER SOURCE SYSTEM AND METHOD FOR THE SAME

(75) Inventors: Koji Ito, Nagoya (JP); Toshinori Esaka, Aichi-ken (JP); Hidenori Matsuto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 137 days.

(21) Appl. No.: 12/373,833

(22) PCT Filed: Jul. 17, 2007

(86) PCT No.: PCT/IB2007/002005
§ 371 (c)(1),
(2), (4) Date: Jan. 14, 2009

(87) PCT Pub. No.: WO2008/010062
PCT Pub. Date: Jan. 24, 2008

(65) Prior Publication Data
US 2009/0261796 A1    Oct. 22, 2009

(30) Foreign Application Priority Data

Jul. 18, 2006  (JP) .................................. 2006-196000

(51) Int. Cl.
*B60L 1/00*    (2006.01)
(52) U.S. Cl. ....................................................... 307/9.1
(58) Field of Classification Search .................... 307/9.1
See application file for complete search history.

(56) References Cited

U.S. PATENT DOCUMENTS

| | | | |
|---|---|---|---|
| 5,796,175 A | 8/1998 | Itoh et al. | |
| 7,030,511 B2 * | 4/2006 | Zarei | ............... 307/39 |
| 2003/0191576 A1 | 10/2003 | Zarei | |
| 2004/0062059 A1 | 4/2004 | Cheng et al. | |
| 2006/0097576 A1 | 5/2006 | Kobayashi et al. | |
| 2009/0206660 A1 * | 8/2009 | Makita et al. | .................. 307/9.1 |

FOREIGN PATENT DOCUMENTS

| | | |
|---|---|---|
| JP | 2002-112534 | 4/2002 |
| JP | 2002-176704 | 6/2002 |
| JP | 2004-88853 | 3/2004 |
| JP | 2004-222474 | 8/2004 |
| JP | 2005-184965 | 7/2005 |
| JP | 2005-261059 | 9/2005 |

OTHER PUBLICATIONS

"Notification Concerning Rejection Reason" dated Jun. 3, 2008, in Japanese Patent Application No. 2006-196000, filed Jul. 18, 2006.

* cited by examiner

*Primary Examiner* — Robert L. Deberadinis
(74) *Attorney, Agent, or Firm* — Finnegan, Henderson, Farabow, Garrett & Dunner, LLP

(57) ABSTRACT

An electric power source system in which a momentary interruption of the electric power supply does not occur when the direction of voltage conversion is switched by a voltage conversion device that is capable of bidirectional voltage conversion. The electric power source system includes a bidirectional switching regulator that selectively switches between the voltage conversion in the step-up direction from a low-voltage system to a high-voltage system and the voltage conversion in the step-down direction from the high-voltage system to the low-voltage system, and a linear regulator, connected in parallel to the bidirectional switching regulator, that converts voltage in the step-down direction. The direction of current that flows via the bidirectional switching regulator switches from the step-up direction to the step-down direction after current flows in the step-down direction via the linear regulator.

12 Claims, 4 Drawing Sheets

ELECTRIC POWER SOURCE SYSTEM AND METHOD FOR THE SAME

CROSS-REFERENCE TO RELATED APPLICATIONS

This application is a national phase application of International Application No. PCT/IB2007/002005, filed Jul. 17, 2007, and claims the priority of Japanese Application No. 2006-196000, filed Jul. 18, 2006, the contents of both of which are incorporated herein by reference.

BACKGROUND OF THE INVENTION

1. Field of the Invention

The invention relates to an electric power source system that has a plurality of electric power sources, and a method that controls an electric power source system.

2. Description of the Related Art

An electric power source control device that employs batteries of two different voltage systems is described in Japanese Patent Application Publication No. JP-A-2002-176704. In some cases, electric power source control devices that employ a plurality of electricity storage devices, including the electric power source control device described in JP-A-2002-176704, convert the voltage of a first electricity storage device to the voltage of a second electricity storage device via voltage converter, such as a DC/DC converter or the like and thereby charge the second electricity storage device or supply electric power to an electrical load whose direct power source is the second electricity storage device.

In the foregoing related-art technology that enables the bidirectional exchange of current between different voltage systems, however, when the voltage converter switches the direction of voltage conversion to the opposite direction, the supply of current is momentarily interrupted due to the time lag caused by the switching operation. Therefore, a system in which the interruption is avoided needs an effective measure to prevent the interruption.

In relation to this respect, JP-A-2002-176704 describes a condition for switching the voltage conversion direction, but does not disclose or indicate a measure as mentioned above.

SUMMARY OF THE INVENTION

The invention provides an electric power source system that prevents the momentary interruption in the supply of electric power when the direction of voltage conversion is switched by a voltage conversion device, and a method for an electric power source.

A first aspect of the electric power source system according to the invention includes a first voltage conversion device that selectively switches between voltage conversion in a first direction from a first voltage system to a second voltage system, and voltage conversion in a second direction from the second voltage system to the first voltage system; and a second voltage conversion device, connected in parallel to the first voltage conversion device, that converts the voltage in the second direction. In particular, the direction of current flowing via the first voltage conversion device switches from the first direction to the second direction after current starts to flow in the second direction via the second voltage conversion device.

That is, in the above aspect of the electric power source system, when the current flow direction of the first voltage conversion device is switched, the direction of the current switches from the first direction to the second direction only after current has begun to flow in the second direction via the second voltage conversion device. Therefore, when the direction of transfer of electric power switches from the first direction to the second direction in the first voltage conversion device, the current has already begun to flow in the second direction via the second voltage conversion device. Thus, the electric power source system of the invention prevents the interruption in the supply of electric power via the first voltage conversion device.

In addition, the electric power source system of the first aspect of invention may further include a malfunction detector that detects malfunctions of the first voltage system; and a switching controller that outputs a command signal to switch the direction of current that flows via the first voltage conversion device from the first direction to the second direction if a malfunction in the first voltage system is detected by the malfunction detector. In particular, the first voltage conversion device begins to cause current to flow in the second direction after the direction of current has been switched from the first direction to the second direction based on the command signal output by the switching controller, and the second voltage conversion device begins to cause current to flow in the second direction when the voltage of the first voltage system becomes equal to or lower than a predetermined output voltage.

To cause current to flow in the second direction via the first voltage conversion device, it is necessary to switch the direction of current after a malfunction is detected. However, to cause current to flow in the second direction via the second voltage conversion device, it is not necessary to switch the direction of current. Therefore, if current is caused to flow in the second direction via the second voltage conversion device, there is no time lag associated with the switching of the direction of current. That is, current can be caused to begin to flow in the second direction more quickly by causing current to flow in the second direction via the second voltage conversion device than by causing current to flow in the second direction via the first voltage conversion device.

The electric power source system may further include a current detector that detects the current flowing in the second direction via the second voltage conversion device, wherein the malfunction detector determines that a malfunction has occurred in the first voltage system if a current equal to or higher than a predetermined value is detected by the current detector.

If a malfunction occurs in the first voltage system, the voltage of the first voltage system begins to drop. Therefore, by detecting current that flows via the second voltage conversion device, provided for causing current to begin to flow at a time point when the voltage of the first voltage system becomes equal to or lower than the predetermined output voltage, any malfunction in the first voltage system may be detected.

Furthermore, the electric power source system of the aspect of the invention may have a construction in which current flows in the second direction via either of the first voltage conversion device or the second voltage conversion device that has a greater output voltage in the second direction. In addition, the target output voltage in the second direction set for the first voltage conversion device is higher than the target output voltage in the second direction set for the second voltage conversion device.

When the direction of current that flows via the first voltage conversion device switches from the first direction to the second direction, the voltage conversion device that causes current to flow in the second direction may be quickly switched from the second voltage conversion device to the first voltage conversion device. That is, causing current to flow in the second direction via the first voltage conversion device may be given priority, and causing current to flow in the second direction via the second voltage conversion device may be limited to a short time.

A concrete example of the first voltage conversion device is a switching regulator, and a concrete example of the second voltage conversion device is a linear regulator or a resistor.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

Figure 1:
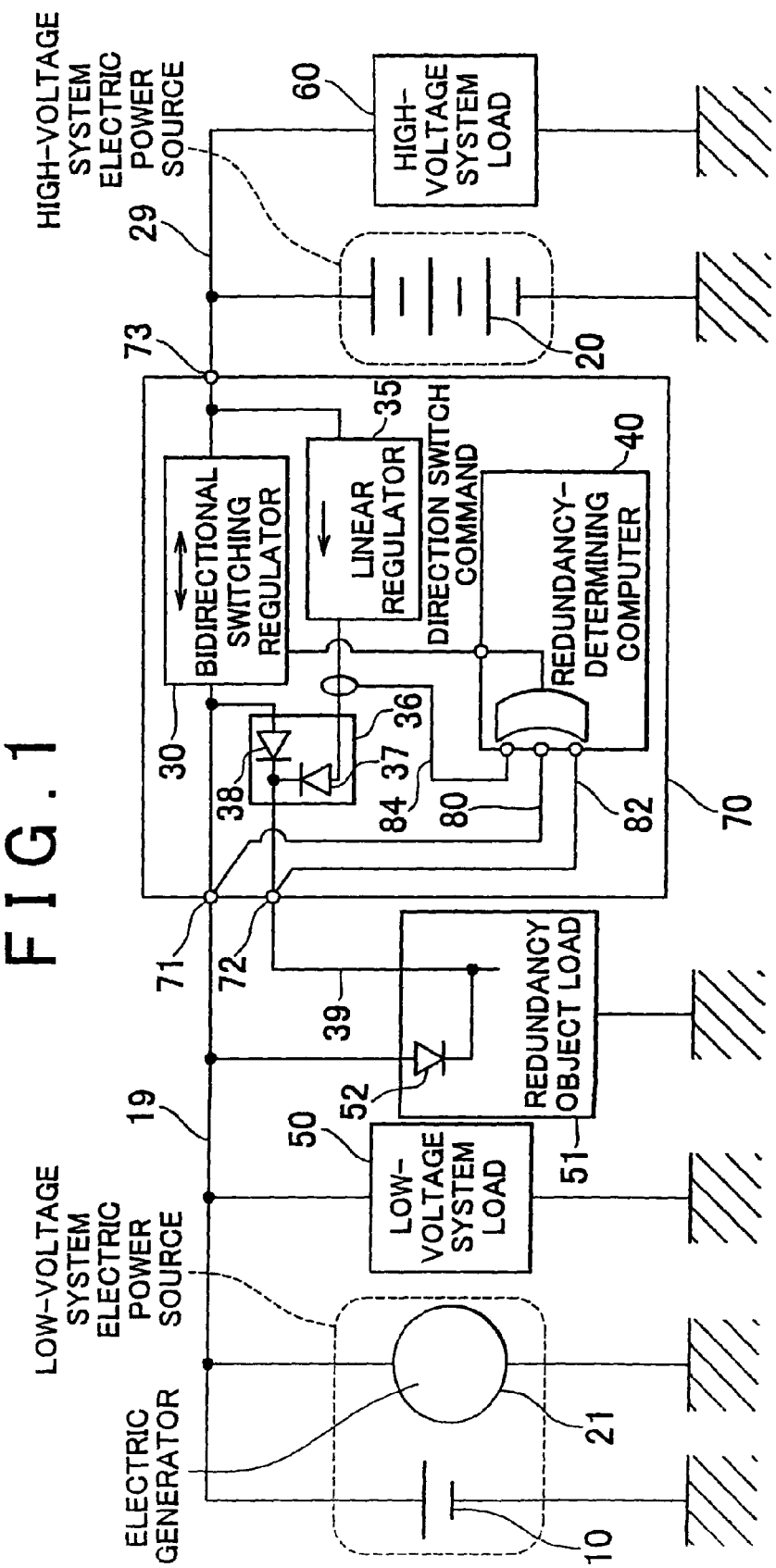
FIG. 1 is a schematic diagram showing the first embodiment of the vehicular electric power source system of the invention.

Hereinafter, example embodiments of the invention will be described with reference to the accompanying drawings. FIG. 1 is a schematic diagram showing a first embodiment of the vehicular electric power source system of the invention. A vehicle in which a vehicular electric power source system is mounted is equipped with a high-voltage system battery 20 that is an electricity storage device of a high-voltage system (e.g., a 42-V system), a low-voltage system battery 10 that is an electricity storage device of a low-voltage system (e.g., a 14-V system), a DC/DC voltage converter (DC/DC converter) 70 that has at least a step-down voltage conversion mode, which decreases the voltage of the high-voltage system to the voltage of the low-voltage system and thus supplies electric power from the high-voltage system to the low-voltage system, and a step-up voltage conversion mode, which increases the voltage of the low-voltage system to the voltage of the high-voltage system and thus supplies electric power from the low-voltage system to the high-voltage system.

A plurality of electrical loads exist in a vehicle, and sometimes electrical loads of different voltage systems exist together. The high-voltage system battery 20 mainly supplies electric power to high-voltage system loads 60 that operate at the voltage of the high-voltage system, and the low-voltage system battery 10 mainly supplies electric power to low-voltage system loads 50 that operate at the voltage of the low-voltage system. A concrete example of the high-voltage system battery 20 is a lithium ion battery, and a concrete example of the low-voltage system battery 10 is a lead-acid battery. A lithium ion battery has greater power density (in W/kg or W/l), lower internal resistance, and lower the energy loss caused by charging and discharging than a lead-acid battery. The low-voltage system battery 10 and the high-voltage system battery 20 may be a nickel hydride battery and an electric double layer capacitor, or may be any appropriate combination of a lead-acid battery, a lithium ion battery, a nickel hydride battery and an electric double layer capacitor.

The low-voltage system battery 10 is connected via a low-voltage system power source line 19 to an electric generator 21 that generates electricity by converting kinetic energy into electric energy. The electric generator 21 generates electric power using the output of an engine for running the vehicle. The electric power generated by the electric generator 21 is supplied to the low-voltage system load 50, or is used to charge the low-voltage system battery 10. Power may be supplied to a high-voltage system load 60 via the DC/DC converter 70 described below. A concrete example of the electric generator 21 is an alternator. As the rotational speed of the engine increases, the amount of electric power generated by the alternator increases. Incidentally, the charging of the low-voltage system battery 10 or the like may also be accomplished by the regenerative operation of a motor (electric motor). Therefore, the electric generator 21 may be a motor that is capable of being regeneratively controlled. For example, through the regenerative control of the motor linked to a wheel-driving shaft for the purpose of securing a braking force of the vehicle, the charging of the low-voltage system battery 10 or the supply of electric power to the low-voltage system load 50 can be performed via an inverter.

Furthermore, during a stopped state of the electric generator 21, electric power may be supplied from the low-voltage system battery 10 to the low-voltage system load 50. For example, the electric power needed during a parked state of the vehicle in which the engine is stopped and the alternator is in a non-operation state may be supplied from the low-voltage system battery 10.

Examples of the high-voltage system load 60 on the high-voltage system battery 20 include an electric power steering device (EPS) that assists the driver's steering operation by causing an electric motor to produce assist power in accordance with the state of steering, an electric stability control device (electric STB) that adjusts the roll angle of the vehicle or the like via an electric motor in accordance with the acceleration of the vehicle in the lateral direction. The EPS has an EPS motor that is an electric motor, and an inverter that drives the EPS motor. The electric STB has an electric STB motor that is an electric motor, and an inverter that drives the electric STB motor.

Examples of the low-voltage system load 50 on low-voltage system battery 10 include an engine control device, a brake control device, an air-conditioner, a headlight, a rear defogger, a rear window wiper, a mirror heater, a seat heater, an audio, lamps, a cigar lighter socket, various ECUs (Electronic Control Units), and solenoid valves. The low-voltage system load 50 is connected in parallel to the low-voltage system battery 10 and the electric generator 21, and is also connected to a low-voltage system battery terminal 71 of the DC/DC converter 70.

As a low-voltage system load on the low-voltage system battery 10, a redundancy object load 51 exists. The redundancy object load 51 is an electrical load that requires a continuous power supply of a certain level or higher (e.g., a steer-by-wire device, an electric brake device, an emergency alert device). That is, the redundancy object load 51 is an electrical load that needs continuous power supply even if a malfunction or a failure should occur in either the low-voltage system electric power source, including the low-voltage system battery 10 and the electric generator 21, or in the low-voltage system power source line 19. The redundancy object load 51 is connected in parallel to the low-voltage system battery 20 and the electric generator 21, and is also connected to the low-voltage system battery terminal 71 of the DC/DC converter 70. Furthermore, the redundancy object load 51 is connected to a redundancy object load electric power supply terminal 72 of the DC/DC converter 70 via a redundancy object load power source line 39, so that the even if a malfunction or a failure occurs in the low-voltage system electric power source or the low-voltage system power source line 19, the redundancy object load 51 is supplied with electric power from the DC/DC converter 70. The redundancy object load electric power supply terminal 72 of the DC/DC converter 70 is connected to a low-voltage system terminal of a bidirectional switching regulator 30 (which is at the same electric potential as the low-voltage system battery terminal 71 of the DC/DC converter 70) via a diode 38. Because the redundancy object load 51 is provided with a diode 52, the current supplied to the redundancy object load 51 through the redundancy object load power source line 39 does not flow into the low-voltage system power source line 19. Because the diode 38 is provided, the current supplied to the redundancy object load 51 through the low-voltage system power source line 19 does not flow into the redundancy object load power source line 39.

The DC/DC converter 70, using the built-in bidirectional switching regulator 30, which is voltage conversion device, performs the step-down conversion of the voltage of the high-voltage system battery 20 and outputs the stepped-own voltage to the redundancy object load electric power supply terminal 72 via the low-voltage system battery terminal 71 on the low-voltage system battery 10 and the diode 38, or performs the step-up conversion of the voltage of the low-voltage system battery 10 and outputs the stepped-up voltage to a high-voltage system battery terminal 73 on the high-voltage system battery 20. The bidirectional switching regulator 30 is controlled by a computer 40.

The computer 40 sets the operation mode of the DC/DC converter 70 to one of a step-down mode, which steps the voltage of the high-voltage system battery 20 down and outputs the stepped-down voltage to the low-voltage system battery 10; a step-up mode which steps the voltage of the low-voltage system battery 10 up and outputs the stepped-up voltage to the high-voltage system battery 20; and a stop mode, in which the voltage conversion and output are both stopped. That is, the computer 40 controls the operating direction (voltage conversion direction) of the bidirectional switching regulator 30 by supplying the bidirectional switching regulator 30 with a switch command signal to selectively switch the voltage conversion direction (i.e., a signal that commands the setting of the direction of voltage conversion to the "step-up direction" in which the voltage of the low-voltage system battery 10 is raised and then supplied to the high-voltage system battery 20, and a signal that commands the setting of the direction of voltage conversion to the "step-down direction" in which the voltage of the high-voltage system battery 20 is lowered and then supplied to the low-voltage system battery 10).

The computer 40 also controls the output voltage of the low-voltage system battery terminal 71 of the DC/DC converter 70. The computer 40 controls the output voltage of the low-voltage system battery terminal 71 in accordance with a target output voltage (i.e., a predetermined output voltage, e.g., a voltage value in the range of 13.5 V to 14.5 V) of the low-voltage system battery terminal 71 of the DC/DC converter 70 which is supplied as a command to the computer 40, or in accordance with a target output voltage thereof that the computer 40 sets on the basis of the operating state of the vehicle (e.g., an accelerating state of the vehicle, a steady running state, an idle operating state of the engine, an idle stop state), the state of power generation of the electric generator 21, the states of the individual batteries, etc. On the basis of the target output voltage of the low-voltage system battery terminal 71, the computer 40 supplies a switch command signal for setting the direction of voltage conversion of the bidirectional switching regulator 30 to the step-down direction. The bidirectional switching regulator 30, on the basis of the switch command signal, lowers the voltage of the high-voltage system battery 20 to the target output voltage and outputs it to the low-voltage system battery 10. Therefore, on the high-voltage system battery 20, discharge is performed in accordance with the target output voltage (or the generated voltage of the electric generator 21).

The control of the output voltage of the low-voltage system battery terminal 71 may be executed during the idle stop or when the high-voltage system battery 20 is overcharged. Therefore, during an idle stop, the high-voltage system battery 20, taking the place of the low-voltage system battery 10, functions as an electric power source of the low-voltage system load 50 and the redundancy object load 51, and prevents reduction of the service life of the low-voltage system battery 10. Furthermore, during the overcharged state of the high-voltage system battery 20, the discharge of the high-voltage system battery 20 is promoted, and the overcharged state of the high-voltage system battery 20 can be resolved.

Similarly, the computer 40 controls the output voltage of the high-voltage system battery terminal 73 of the DC/DC converter 70. The computer 40 controls the output voltage of the high-voltage system battery terminal 73 in accordance with a target output voltage (i.e., a predetermined output voltage, e.g., a voltage value in the range of 40.5 V to 43.5 V) of the high-voltage system battery terminal 73 of the DC/DC converter 70, which is supplied as a command to the computer 40, or in accordance with a target output voltage thereof that the computer 40 sets on the basis of the operating state of the vehicle (e.g. an accelerating state of the vehicle, a steady running state, an idle operating state of the engine, an idle stop state), the state of power generation of the electric generator 21, the states of the individual batteries, etc. Based on the target output voltage of the high-voltage system battery terminal 73, the computer 40 supplies a switch command signal for setting the direction of voltage conversion of the bidirectional switching regulator 30 to the step-up direction. The bidirectional switching regulator 30, on the basis of the switch command signal, raises the voltage of the low-voltage system battery 10 to the target output voltage and outputs it to the high-voltage system battery 20. Therefore, the charging of the high-voltage system battery 20 in accordance with the target output voltage is realized.

The control of the output voltage of the high-voltage system battery terminal 73 may be executed during a steady running state of the vehicle, the idle operation of the engine, or the deceleration of the vehicle (the regenerative braking operation). At this time, the charging is also performed on the low-voltage system battery 10 in accordance with the target output voltage of the high-voltage system battery terminal 73 and the generated voltage of the electric generator 21.

Then, the computer 40 stops the operation of the bidirectional switching regulator 30 when the computer 40 receives a control signal to stop the operation of the bidirectional switching regulator 30, or when the supply of the foregoing switch command signal to the computer 40 is stopped. The stopping of the operation of the bidirectional switching regulator 30 may be executed during the acceleration of the vehicle.

An appropriate operation mode of the DC/DC converter 70 may be selected from the foregoing operation modes in accordance with the operating state of the vehicle (e.g., the accelerating state of the vehicle, the steady running state, the idle operating state of the engine, the idle stop state), the state of power generation of the electric generator 21, the states of the individual batteries, etc. For example, as stated above, if the high-voltage system battery 20 is overcharged, the step-down mode may be implemented in order to promote the discharge of the high-voltage system battery 20. Furthermore, during the idle stop state (i.e., the electric generator 21 is not generating electric power), the step-down mode may be implemented to prevent reduction of the service life of the low-voltage system battery 10. Furthermore, the step-up mode may be implemented during the steady run of the vehicle, the idle operation of the engine, or the regenerative braking operation, and the stop mode may be implemented during the acceleration of the vehicle.

Therefore, while monitoring the information (e.g., the engine rotation speed, the state of power generation of the electric generator 21) acquired from an ECU (not shown) or the output values of various sensors, such as an accelerator pedal sensor and the like, the DC/DC converter 70 implements an operation mode that is in accordance with the operating state of the vehicle or the like if the operating state of the vehicle or the like reaches a predetermined state (i.e., a switch among the operation modes of the DC/DC converter 70 is implemented if a predetermined switching condition is satisfied).

Figure 2:
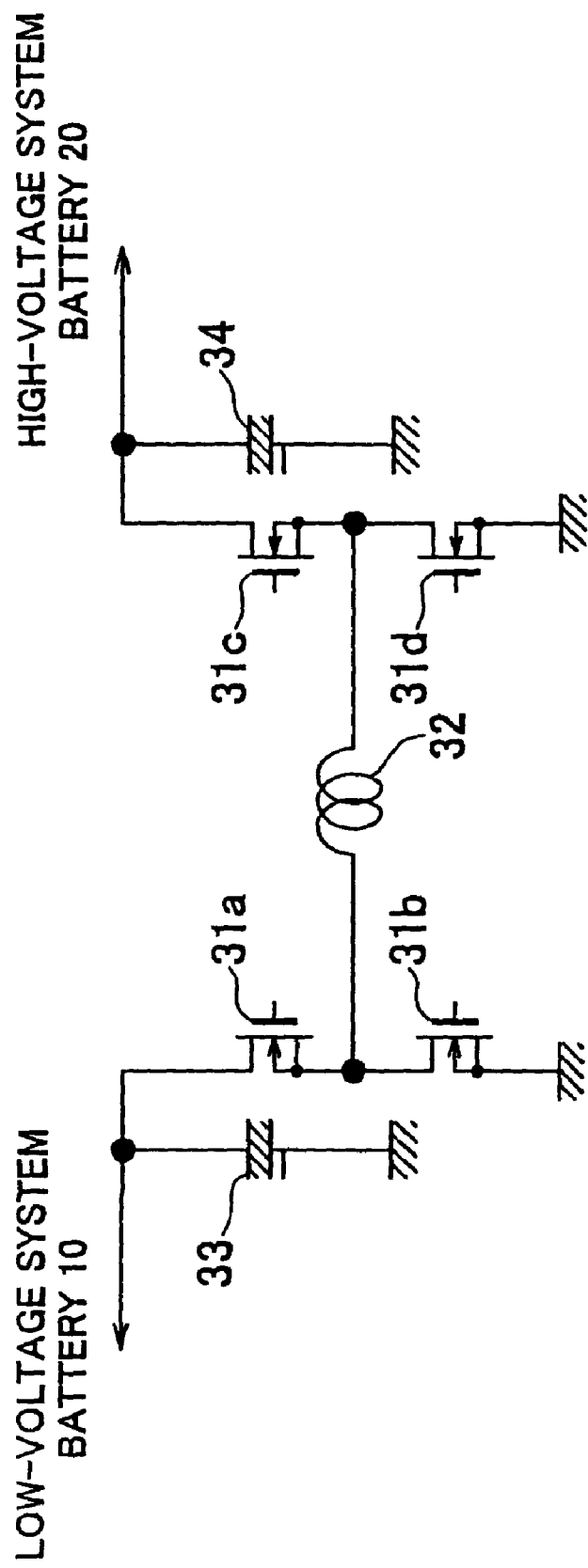
FIG. 2 shows a concrete example of the bidirectional switching regulator 30.

FIG. 2 shows a concrete example of the bidirectional switching regulator 30 that implements the switch of the operation mode of the DC/DC converter 70. The bidirectional switching regulator 30 is made up of switching elements 31a to 31d, such as power transistors or the like, an inductor 32, a low-voltage system smoothing capacitor 33, and a high-voltage system smoothing capacitor 34 to form a bridge circuit. The bridge circuit has one current path that connects the low-voltage system battery 10 and the high-voltage system battery 20. A left side end of the current path in FIG. 2 is connected to the low-voltage system battery terminal 71 (see FIG. 1), and a right side end thereof in FIG. 2 is connected to the battery terminal 73 (see FIG. 1). Specifically, the inductor 32 is connected in series on a line connecting the low-voltage system battery terminal 71 and the high-voltage system battery terminal 73. The low-voltage system smoothing capacitor 33 and the high-voltage system smoothing capacitor 34 are each capable of storing the electric power supplied from the electric generator 21 of the low-voltage system battery 10 or the electric power supplied from the high-voltage system battery 20, and of discharging electric power.

The bidirectional switching regulator 30 made up of the bridge circuit shown in FIG. 2 is driven by the computer 40. Specifically, the computer 40 is connected to the gate of each one of the switching elements 31a to 31d, and drives each of the switching elements 31a to 31d. The computer 40 drives the switching elements 31a to 31d in a predetermined pattern to realize the step-up conversion from the low-voltage system voltage to the high-voltage system voltage or the step-down conversion from the high-voltage system voltage to the low-voltage system voltage. Each of the switching elements 31a to 31d performs switching operation in accordance with a drive signal from the computer 40.

To set the operation mode of the DC/DC converter 70 to the step-up mode, the computer 40 first sets a duty ratio of the switching elements 31a to 31d on the basis of the target output voltage of the high-voltage system battery terminal 73, and turns on the switching elements 31a, 31d and turns off the switching elements 31b, 31c in accordance with the set duty ratio. When the switching elements 31a, 31d are turned on and the switching elements 31b, 31c are turned off, current flows in the inductor 32 from the low-voltage system toward the high-voltage system, so that electric power is stored in the inductor 32. While electric power is stored in the inductor 32, the computer 40 turns off the switching elements 31a, 31d and turns on the switching elements 31b, 31c in accordance with the set duty ratio. When the switching elements 31a, 31d are turned off and the switching elements 31b, 31c are turned on, the electric power stored in the inductor 32 is charged into the smoothing capacitor 34, so that the smoothed voltage that is higher than the voltage of the low-voltage system battery 10 is output to the high-voltage system battery 20.

Furthermore, to set the operation mode of the DC/DC converter 70 to the step-down mode, the computer 40 sets a duty ratio of the switching elements 31a to 31d on the basis of the target output voltage of the low-voltage system battery terminal 71, and turns off the switching elements 31a, 31d and the turns on the switching elements 31b, 31c in accordance with the set duty ratio. When the switching elements 31a, 31d are turned off and the switching elements 31b, 31c are turned on, current flows in the inductor 32 from the high-voltage system toward the low-voltage system, so that electric power is stored in the inductor 32. While electric power is stored in the inductor 32, the computer 40 turns on the switching elements 31a, 31d and the turns off the switching elements 31b, 31c in accordance with the set duty ratio. When the switching elements 31a, 31d are turned on and the switching elements 31b, 31c are turned off, the electric power stored in the inductor 32 is charged into the smoothing capacitor 33, so that the smoothed voltage that is lower than the voltage of the high-voltage system battery 20 is output to the low-voltage system battery 10.

Therefore, due to the voltage conversion function of the DC/DC converter 70, it is possible to step the voltage of the high-voltage system battery 20 down and accordingly supply electric power to the low-voltage system load 50 or charge the low-voltage system battery 10, and it also becomes possible to step the voltage of the low-voltage system battery 10 up and accordingly supply electric power to the high-voltage system load 60 or charge the high-voltage system battery 20, and it also becomes possible to stop the voltage conversion so that the supply of electric power is not performed.

Incidentally, the computer 40 is made up of a plurality of circuit elements, such as a ROM that stores a control program and control data, a RAM for temporarily storing process data of control programs, a CPU that executes control programs, an input/output interface for exchanging data with the outside, etc. The computer 40 may be a computer provided outside the DC/DC converter 70, instead of the one provided within the DC/DC converter 70.

The redundancy object load 51 is connected to the redundancy object load electric power supply terminal 72 of the DC/DC converter 70 via the redundancy object load power source line 39, so that electric power of a certain level or higher can be continuously supplied from the DC/DC converter 70 even if there is a malfunction in the low-voltage system electric power source or the low-voltage system power source line 19 occurs, such as an open-circuit failure, a short-circuit failure, etc., as described above.

However, because the direction of current is reversed in the process of switching the direction of the voltage conversion through the use of the bidirectional switching regulator 30, or because a certain amount of time for switching the voltage conversion direction is needed, a momentary interruption in the supply of electric power occurs. For example, when a malfunction occurs in the low-voltage system electric power source or the like, a time lag of several milliseconds occurs before the DC/DC converter 70 switches from the step-up mode to the step-down mode in order to supply electric power to the low-voltage system. During the time lag, no electric power is supplied to the low-voltage system load 50 or the redundancy object load 51 after the detection of the malfunction. Therefore, if an electrical load that needs to be constantly supplied with an electric power of a certain level or higher, such as the redundancy object load 51, is connected, it is necessary to provide a measure for preventing the momentary interruption of the electric power supply that occurs when switching the voltage conversion direction of the bidirectional switching regulator 30.

To take such a countermeasure, the vehicular electric power source system of this embodiment includes a linear regulator 35 and a diode OR-circuit 36.

The linear regulator (series regulator) 35 steps the voltage of the high-voltage system battery 20 down, and outputs the stepped-down voltage to the low-voltage system battery 10. A high-voltage system battery 20 input terminal of the linear regulator 35 is connected to the high-voltage system battery terminal 73 of the DC/DC converter 70. A low-voltage system battery 10 output terminal of the linear regulator 35 is connected to the anode of the diode 37 of the diode OR-circuit 36. The linear regulator 35 has a power transistor between the high-voltage system battery 20 input terminal and the low-voltage system battery 10 output terminal, and uses the power transistor as a variable resistor to adjust the output voltage of the low-voltage system battery 10 output terminal so that the output voltage thereof becomes constant (converges to the target output voltage). The target output voltage of the low-voltage system battery output terminal of the linear regulator 35 is set at a value which is higher than a minimum operation voltage that is a voltage that the redundancy object load 51 needs for normal operation, and which is lower than the target output voltage of the low-voltage system battery terminal 71 of the bidirectional switching regulator 30. For example, if the minimum operation voltage of the redundancy object load 51 is 10 V and the target output voltage of the low-voltage system battery terminal 71 of the bidirectional switching regulator 30 is 14 V corresponding to the power source voltage of the low-voltage system, then the target output voltage of the low-voltage system battery output terminal of the linear regulator 35 is set as 11 V.

The diode OR-circuit 36 is made up of the diodes 37, 38. The low-voltage output voltage of the bidirectional switching regulator 30 is input to the diode 38 of the diode OR-circuit 36, and the output voltage of the linear regulator 35 is input to the diode 37 of the diode OR-circuit 36. The output terminal of the diode OR-circuit 36 is connected to the redundancy object load 51 via the redundancy object load power source line 39.

The computer 40 calculates the output current of the linear regulator 35 on the basis of the output value of a current sensor 84 that detects the output current of the linear regulator 35. Furthermore, the computer 40 calculates a value of the voltage on the low-voltage system power source line 19 on the basis of the output value of a voltage sensor 80 that detects the voltage on the low-voltage system power source line 19. Still further, the computer 40 also calculates a value of the output voltage on the diode OR-circuit 36 on the basis of the output value of a voltage sensor 82 that detects the output voltage of the diode OR-circuit 36 (the voltage on the redundancy object load power source line 39). The computer 40 uses at least one of the output current value of the linear regulator 35, the voltage value on the low-voltage system power source line 19, and the voltage value on the redundancy object load power source line 39 to determine a switch command signal for setting the voltage conversion direction, and outputs the signal to the bidirectional switching regulator 30.

Now, an operation performed when a malfunction occurs in the low-voltage system electric power source or the low-voltage system power source line 19 in the vehicular electric power source system of the embodiment will be described.

If a malfunction in which the electric power supply performance declines, such as an open-circuit failure or the like, occurs in the low-voltage system electric power source of the like during the step-up mode of the DC/DC converter 70, the voltage on the low-voltage system power source line 19 begins to drop from the low-voltage system power source voltage of 14 V which can be adjusted by the electric generator 21. Along with the voltage drop on the low-voltage system power source line 19, the voltage applied to the redundancy object load 51 also drops. Then, when the voltage on the low-voltage system power source line 19 becomes below the target output voltage of the linear regulator 35, the electric power supply (electrification) from the linear regulator 35 to the redundancy object load 51 via the diode 37 starts on the basis of the OR determination by the two diodes of the diode OR-circuit 36.

If it is detected that the output current value of the linear regulator 35 is greater than or equal to a predetermined current value (any value is appropriate if the value makes it possible to detect passage of current via the linear regulator 35), the computer 40 considers that a malfunction in which the electric power supply performance of the low-voltage system electric power source or the like declines has occurred, and outputs to the bidirectional switching regulator 30 a switch command signal for switching to the voltage conversion in the step-down direction. As described above, a circuit construction is provided in which when a malfunction in which the electric power supply performance of the low-voltage system electric power source declines occurs and therefore the voltage on the low-voltage system power source line 19 becomes below the set output voltage of the linear regulator 35, current flows via the linear regulator 35. Or, the computer 40 may also be designed so that if it is detected by the voltage sensor 80 that the voltage value on the low-voltage system power source line 19 is less than or equal to a predetermined voltage value (that at least satisfies the requirements that the voltage value be greater than or equal to the minimum operation voltage of the redundancy object load 51, and that the amount of voltage drop of the diode 52 have been factored in), the computer 40 considers that a malfunction in which the electric power supply performance of the low-voltage system electric power source or the like declines has occurred, and outputs to the bidirectional switching regulator 30 a switch command signal for switching to the voltage conversion in the step-down direction. This is because the voltage on the low-voltage system power source line 19 declines if there occurs a malfunction in which the electric power supply performance of the low-voltage system electric power source or the like declines. Or, if it is detected by the voltage sensor 82 that the voltage value on the redundancy object load power source line 39 is less than or equal to a predetermined voltage value (that at least satisfies the requirement that the value be greater than or equal to the minimum operation voltage of the redundancy object load 51), the computer 40 considers that a malfunction in which the electric power supply performance of the low-voltage system electric power source or the like declines has occurred, and outputs to the bidirectional switching regulator 30 a switch command signal for switching to the voltage conversion in the step-down direction. This is because the voltage on the redundancy object load power source line 39 declines if a malfunction occurs in which the electric power supply performance of the low-voltage system electric power source or the like declines. Or, on the basis of a combination of some of the foregoing conditions that make it possible to consider that the electric power supply performance of the low-voltage system electric power source or the like has declined, a switch command signal for switching to the voltage conversion in the step-down direction may be output to the bidirectional switching regulator 30. Due to the redundancy determination regarding the decline of the electric power supply performance of the low-voltage system electric power source or the like through the use of a combination of the foregoing conditions, the reliability of the switching control of the voltage conversion direction of the bidirectional switching regulator 30 improves.

Upon input of the switch command signal for switching the voltage conversion to the step-down direction, the bidirectional switching regulator 30 switches the voltage conversion direction from the step-up direction to the step-down direction, and starts supplying electric power at a voltage (target output voltage of the low-voltage system battery terminal 71 of the bidirectional switching regulator 30) that is higher than the target output voltage of the linear regulator 35. The target output voltage of the low-voltage system battery terminal 71 of the bidirectional switching regulator 30 is set to a voltage that is higher than the target output voltage of the linear regulator 35. Therefore, when the voltage conversion direction of the bidirectional switching regulator 30 switches to the step-down direction, the electric power supply (electrification) from the linear regulator 35 to the redundancy object load 51 via the diode 37 stops and the electric power supply (electrification) from the bidirectional switching regulator 30 to the redundancy object load 51 via the diode 38 and the diode 52 starts on the basis of the OR determination by the two diodes 37, 38 of the diode OR-circuit 36.

It is desirable that the transfer of electric power to the low-voltage system is executed only when the remaining amount of charge of the high-voltage system battery 20 is greater than or equal to a predetermined value. This will prevent the decline of the electric power supply performance of the high-voltage system caused by the execution of the transfer of electric power to the low-voltage system while the remaining amount of charge of the high-voltage system battery 20 is small. The electric power transfer to the low-voltage system may be executed only when the high-voltage system load 60 is not operated. This prevents unstable operation of the high-voltage system load 60 (in particular, an electrical load whose power consumption is large, such as an EPS or the like).

Thus, the vehicular electric power source system of this embodiment is constructed so that the direction of the current that flows via the bidirectional switching regulator 30 switches from the step-up direction to the step-down direction after current flows in the step-down direction via the linear regulator 35. Therefore, it is possible to prevent the occurrence of a state where the electric power supply to the redundancy object load 51 momentarily declines or stops when the direction of the electric power transfer of the bidirectional switching regulator 30 is switched from the step-up direction to the step-down direction because of a decline of the electric power supply performance of the low-voltage system electric power source or the like.

After the direction of current that flows via the bidirectional switching regulator 30 switches from the step-up direction to the step-down direction, the electric power supply via the bidirectional switching regulator 30 instead of the linear regulator 35 is automatically and quickly performed. Therefore, the operation time of the linear regulator 35 is very short. The linear regulator has an advantage of having fewer component parts and being less expensive than the switching regulator, but has a disadvantage in that it releases a large amount of heat and therefore needs a large radiator. However, because the use of the linear regulator is limited exclusively to when the voltage conversion direction of the bidirectional switching regulator 30 is switched, a relatively small radiator suffices, and therefore the linear regulator 30 can be smaller in size and lower in cost than a switching regulator.

Figure 3:
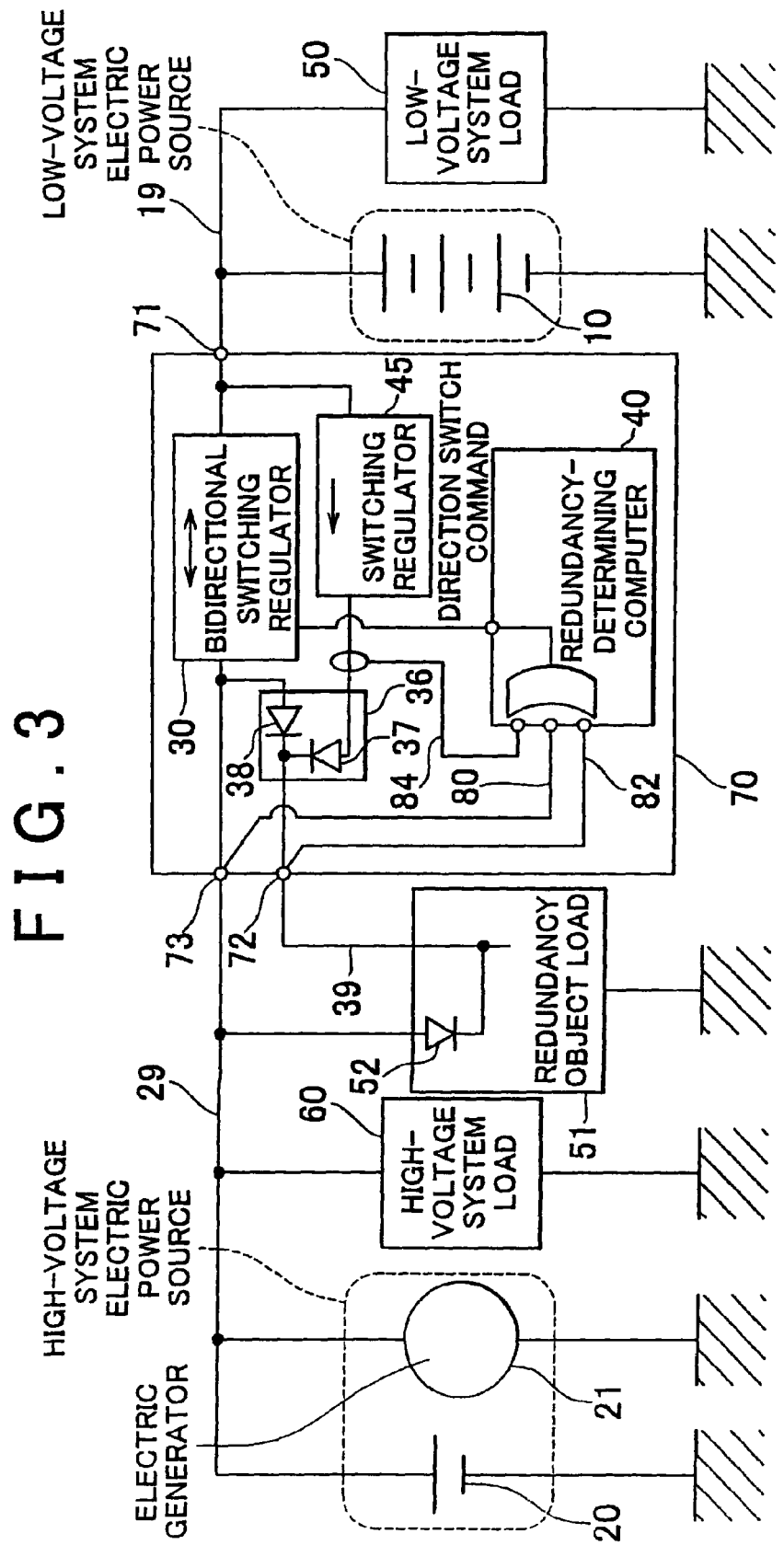
FIG. 3 is a schematic diagram showing the second embodiment of the vehicular electric power source system of the invention.

FIG. 3 is a schematic diagram showing a second embodiment of the vehicular electric power source system of the invention. The vehicular electric power source system of the second embodiment differs from the vehicular electric power source system of the first embodiment in that the electric generator 21 and the redundancy object load 51 are set as a high-voltage system, and in that the regulator connected in parallel to the bidirectional switching regulator 30 is not a linear regulator, but is replaced by a switching regulator 45.

Similar to the vehicular electric power source system of the first embodiment constructed on the assumption that a malfunction, such as an open-circuit failure, a short-circuit failure, etc., occurs in the low-voltage system electric power source or the low-voltage system power source line 19, the vehicular electric power source system of the second embodiment has a construction in which the redundancy object load 51 is connected to the redundancy object load electric power supply terminal 72 of the DC/DC converter 70 via the redundancy object load power source line 39 so that an electric power of a certain level or higher is continuously supplied from the DC/DC converter 70 even if a malfunction, such as an open-circuit failure, a short-circuit failure, etc., occurs in the high-voltage system electric power source or the high-voltage system power source line 29.

However, as is the case with the first embodiment, because the direction of current flow is reversed in the process of switching the direction of the voltage conversion through the use of the bidirectional switching regulator 30, or since an amount of time for switching the voltage conversion direction is needed, a momentary interruption in the electric power supply occurs. For example, when a malfunction occurs in the high-voltage system electric power source or the like, a time lag of several milliseconds occurs before the DC/DC converter 70 switches from the step-down mode to the step-up mode in order to secure the supply of electric power source for the high-voltage system. During the time lag, no electric power is supplied to the high-voltage system load 60 or the redundancy object load 51 after the malfunction is detected. Therefore, if an electrical load that needs to be constantly supplied with an electric power of a certain level or higher, such as the redundancy object load 51, is connected, it is necessary to provide a measure for preventing the momentary interruption of the electric power supply that occurs when switching the voltage conversion direction of the bidirectional switching regulator 30.

The switching regulator 45 steps the voltage of the low-voltage system battery 10 up, and outputs the stepped-up voltage to the high-voltage system battery 20. A low-voltage system battery 10 input terminal of the switching regulator 45 is connected to the low-voltage system battery terminal 71 of the DC/DC converter 70. A high-voltage system battery 20 output terminal of the switching regulator 45 is connected to the anode of the diode 37 of the diode OR-circuit 36. The target output voltage of the high-voltage system battery output terminal of the switching regulator 45 is set at a value which is higher than the minimum operation voltage that the redundancy object load 51 needs for normal operation, and which is lower than the target output voltage of the high-voltage system battery terminal 73 of the bidirectional switching regulator 30. For example, if the minimum operation voltage of the redundancy object load 51 is 41 V and the target output voltage of the high-voltage system battery terminal 73 of the bidirectional switching regulator 30 is 43 V, which corresponds to the power source voltage of the high-voltage system, then the output set voltage of the high-voltage system battery output terminal of the switching regulator 45 is set as 42 V. During the process of switching the voltage conversion direction of the bidirectional switching regulator 30, the switching regulator 45 at least avoids the switching of the direction of the voltage conversion, and the voltage conversion direction is set to the step-up direction beforehand.

The diode OR-circuit 36 is made up of diodes 37, 38. The high-voltage output voltage of the bidirectional switching regulator 30 is input to the diode 38 of the diode OR-circuit 36, and the output voltage of the switching regulator 45 is input to the diode 37 of the diode OR-circuit 36. The output terminal of the diode OR-circuit 36 is connected to the redundancy object load 51 via the redundancy object load power source line 39.

The output current of the switching regulator 45 is calculated by the computer 40. The computer 40 calculates the output current of the switching regulator 45 on the basis of the output current value of the switching regulator 45 detected by a current sensor 84. Furthermore, the computer 40 can calculate a value of the voltage on a high-voltage system power source line 29 on the basis of the voltage of the high-voltage system power source line 29 detected by a voltage sensor 80. Still further, the computer 40 may also calculate a value of the output voltage of the diode OR-circuit 36 on the basis of the output value of a voltage sensor 82 that detects the output voltage of the diode OR-circuit 36 (the voltage on the redundancy object load power source line 39). The computer 40 uses at least one of the output current value of the switching regulator 45, the voltage value of the high-voltage system power source line 29, and the voltage of the redundancy object load power source line 39 to determine a switch command signal for setting the voltage conversion direction, and outputs the signal to the bidirectional switching regulator 30.

The operation performed when there is a malfunction in the high-voltage system electric power source or the high-voltage system power source line 29 in the vehicular electric power source system of the second embodiment is substantially the same as the operation performed when there is a malfunction in the low-voltage system electric power source or the low-voltage system power source line 19 in the vehicular electric power source system of the first embodiment, and will not be described again.

Thus, the vehicular electric power source system of the second embodiment is constructed so that the direction of current that flows via the bidirectional switching regulator 30 switches from the step-down direction to the step-up direction after current flows in the step-up direction via the switching regulator 45. Therefore, it is possible to prevent the occurrence of a state where the electric power supply to the redundancy object load 51 momentarily declines or stops when the direction of the electric power transfer of the bidirectional switching regulator 30 is switched from the step-down direction to the step-up direction because of a decline of the electric power supply performance of the high-voltage system electric power source or the like. Furthermore, because the switching regulator 45 is provided, it is possible to cause current to flow in the step-up direction even if the redundancy object load 51 is connected to the high-voltage system.

While the example embodiments of the invention have been described in detail, the invention is not restricted by the described embodiments. On the contrary, it is possible to add various modifications and substitutions to the example embodiments without departing from the scope of the invention.

Figure 4:
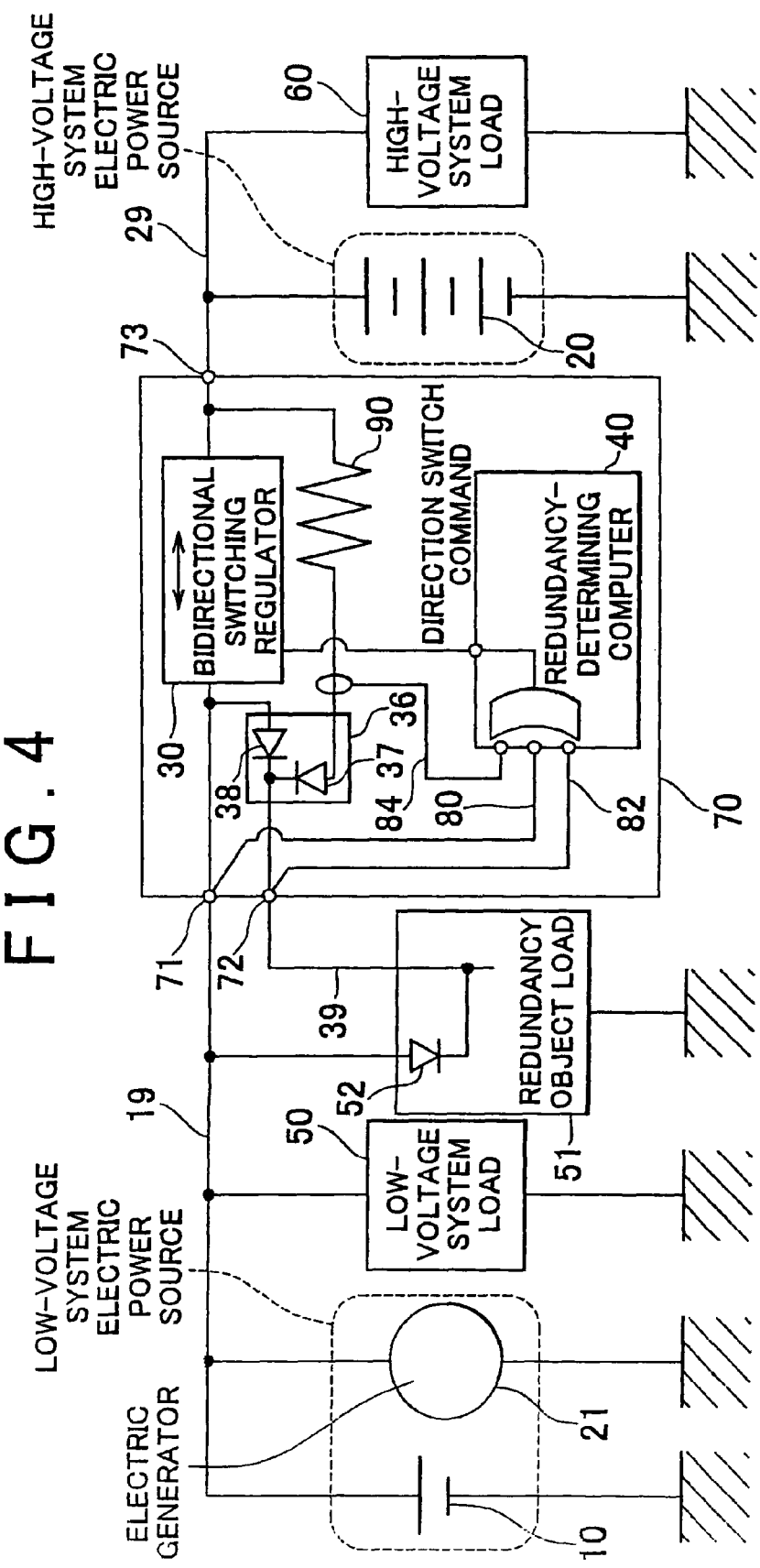
FIG. 4 is a schematic diagram showing the third embodiment of the vehicular electric power source system of the invention.

For example, FIG. 4 is a schematic diagram showing a third embodiment of the vehicular electric power source system of the invention. The vehicular electric power source system of the third embodiment differs from the vehicular electric power source system of the first embodiment in that the linear regulator 35 is replaced by a resistance element 90. The resistance element 90 may serve as a voltage conversion device when current flows through the resistance element 90. In the vehicular electric power source system of the third embodiment, the resistance element 90 generates heat. Therefore, the vehicular electric power source system of the third embodiment can achieve substantially the same effects as the system of the first embodiment only when the redundancy object load 51 is a low-electric power load, if the system of the third embodiment is constructed and operated in substantially the same manner as the system of the first embodiment. The vehicular electric power source system of the third embodiment realizes an even less expensive construction than the system of the first embodiment.

The invention claimed is:

1. An electric power source system comprising:
a first voltage conversion device that selectively switches between voltage conversion in a first direction from a first voltage system to a second voltage system, and voltage conversion in a second direction from the second voltage system to the first voltage system; and
a second voltage conversion device, connected in parallel with the first voltage conversion device, that converts voltage in the second direction;
wherein a direction of current flowing via the first voltage conversion device switches from the first direction to the second direction after current begins flowing in the second direction via the second voltage conversion device;
wherein the electric power source system further comprises a circuit in which the current begins to flow in the second direction via the second voltage conversion device, when a voltage on the first voltage system is below a target output voltage of the second voltage conversion device, which is set to be lower than a voltage of an electric power source contained in the first voltage system; and
wherein a load connected to a first power source line of the first voltage system is connected to an output terminal of the circuit via a second power source line which is different from the first power source line.

2. The electric power source system according to claim 1, further comprising:
a malfunction detector that detects a malfunction in the first voltage system; and
a switching controller that outputs a command signal to switch the direction of current that flows via the first voltage conversion device from the first direction to the second direction if malfunction in the first voltage system is detected by the malfunction detector,
wherein the first voltage conversion device causes current to flow in the second direction after the direction of current has been switched from the first direction to the second direction in response to the command signal output by the switching controller, and
wherein the second voltage conversion device begins to cause current to flow in the second direction when the voltage of the first voltage system becomes equal to or lower than a predetermined output voltage.

3. The electric power source system according to claim 2, further comprising:
   a current detector that detects the current flowing in the second direction via the second voltage conversion device,
   wherein the malfunction detector determines that a malfunction has occurred in the first voltage system if a current equal to or higher than a predetermined value is detected by the current detector.

4. The electric power source system according to claim 1,
   wherein current flows in the second direction via the one of the first voltage conversion device and the second voltage conversion device having a greater output voltage in the second direction, and
   wherein a target output voltage in the second direction set for the first voltage conversion device is greater than the target output voltage in the second direction set for the second voltage conversion device.

5. The electric power source system according to claim 1, wherein the first voltage conversion device is a switching regulator.

6. The electric power source system according to claim 1, wherein the second voltage conversion device is a linear regulator.

7. The electric power source system according to claim 1, wherein the second voltage conversion device is a resistor.

8. The electric power source system according to claim 1, wherein the circuit includes a diode that allows current to flow from the second voltage conversion device to the first voltage system.

9. A method of controlling an electric power source system that includes a first voltage conversion device that selectively switches between voltage conversion in a first direction from a first voltage system to a second voltage system, and voltage conversion in a second direction from the second voltage system to the first voltage system; and second voltage conversion device, connected in parallel with the first voltage conversion device, converts voltage in the second direction; the method comprising:
   switching a direction of current flowing via the first voltage conversion device from the first direction to the second direction after current begins flowing in the second direction via the second voltage conversion device.

10. The method according to claim 9, further comprising:
    determining whether a malfunction has occurred in the first voltage system; and
    switching the direction of current flowing via the first voltage conversion device from the first direction to the second direction if it is determined that a malfunction occurs in the first voltage system,
    wherein current begins to flow in the second direction via the second voltage conversion device when the voltage of the first voltage system becomes equal to or lower than a predetermined output voltage.

11. The method according to claim 10, further comprising:
    detecting the current flowing in the second direction via the second voltage conversion device,
    wherein it is determined that a malfunction has occurred in the first voltage system if a detected current is equal to or higher than a predetermined value.

12. The method according to claim 9,
    wherein current flows in the second direction via the one of the first voltage conversion device and the second voltage conversion device having a greater output voltage in the second direction, and
    wherein a target output voltage in the second direction set for the first voltage conversion device is greater than the target output voltage in the second direction set for the second voltage conversion device.

* * * * *